United States Patent [19]

Keeling et al.

[11] 4,424,261

[45] Jan. 3, 1984

[54] HYDROXYISOPROPYLMELAMINE MODIFIED MELAMINE-FORMALDEHYDE RESIN

[75] Inventors: Ronald J. Keeling; Jin-Young K. Roe; Henry C. Mollmann, all of Cincinnati, Ohio

[73] Assignee: American Cyanamid Company, Stamford, Conn.

[21] Appl. No.: 421,950

[22] Filed: Sep. 23, 1982

[51] Int. Cl.$^3$ .................. B32B 27/04; B32B 27/10; C08L 61/32

[52] U.S. Cl. ................................ 428/530; 427/370; 427/411; 525/515

[58] Field of Search .............. 525/515, 509; 528/254; 428/530

[56] References Cited

U.S. PATENT DOCUMENTS 2,833,674  5/1958  Horwitz ........................... 525/515
3,538,026 11/1970  Standish et al. .................. 524/597

*Primary Examiner*—Theodore E. Pertilla
*Attorney, Agent, or Firm*—Frank M. Van Riet

[57] ABSTRACT

Hydroxyalkylmelamines are disclosed as ingredients in various resins which find use as the resin component of heat and pressure consolidated laminates, especially decorative laminates having either post-formability or a core having a color matching that of the decor sheet.

3 Claims, No Drawings

HYDROXYISOPROPYLMELAMINE MODIFIED MELAMINE-FORMALDEHYDE RESIN

BACKGROUND OF THE INVENTION

Heat and pressure consolidated laminates are generally produced utilizing a core material comprising a plurality of phenolic resin impregnated paper sheets, a decor sheet impregnated with a melamine-formaldehyde resin and, optionally, a melamine-formaldehyde resin impregnated overlay sheet. These laminates have found world-wide success as construction materials i.e. wall panels, countertops etc., in the home and office. They can be prepared so as to function in a variety of service applications and can be produced with surfaces of high gloss, a matte finish or an embossed finish. They can be rendered post-formable with the application of heat and can be cut or worked much in the same manner as other building materials.

Although the above-described laminates have found a high degree of success over the past forty years, there is a continual need to improve the laminates and/or the method of their preparation and, accordingly, research is always on the outlook for means to achieve such improvements.

Two of the properties of heat and pressure consolidated laminates for which an ongoing search for improvement is continually being conducted are the post-formability and the dark edge line present in all laminates containing cores produced from phenolic resins. That is to say, post-formability is now imparted to decorative, heat and pressure consolidated laminates by using a combination of X-creped papers and a less than fully cured resin system in the core. The X-creped papers are substituted in part or in full for the kraft papers which are normally used in non-postforming laminates and, in the production of the laminates per se, the cure cycle employed in the laminating press is such that the resin components in the laminates are not fully cured. The under-curing of the resins reduces the laminate rigidity and enables post-forming to be effected with the application of additional heat in the area of the desired bend.

The dark edge line that is perceptable when conventional laminates are cut or worked has been a particularly difficult problem. If the resin impregnated into the core sheets is a phenolic resin, a photo-darkening takes place upon such exposure resulting in the undesirable edge line. If a water-clear melamine/formaldehyde resin is used to replace the conventional phenolic resin, even if modified with known cross-linking suppressants, laminates made therefrom do not meet the required NEMA Standard properties for high pressure decorative laminate and also often discolor upon exposure, although to a lesser degree than phenolics.

Accordingly, a long-felt need would be satisfied if the post-formability and/or dark edge line of decorative laminates could be improved.

SUMMARY OF THE INVENTION

The use of a melamine/formaldehyde resin containing a hydroxylalkyl melamine as an ingredient thereof in at least one of the core, decor sheet or overlay sheet of decorative laminates enhances the post-formability of said laminates and enables the production of a laminate with a solid color edge matching the decor surface, including white and various pastel colors. The use of the hydroxyalkyl melamine modified resin system results in laminates exhibiting toughness, dimensional stability, impact resistance etc. which meet NEMA Standards for high pressure decorative laminates based on phenolic resin impregnated core sheets. When the core papers are pigmented, preferably the same color as the decor sheet, a color core, (including one of pastel shade) can be obtained, which core is fade resistant when exposed to UV radiation, artificial or natural.

DESCRIPTION OF THE INVENTION INCLUDING PREFERRED EMBODIMENTS

The use of a hydroxyalkylmelamine having Formula I, below

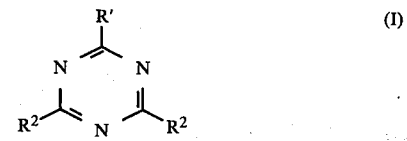

wherein R' is a $C_1$-$C_8$ linear or branched chain alkyl group, a $C_6$-$C_{10}$ aryl group or $R^2$ and $R^2$ is $-NH_2$, $-NH(CH_2)_xOH$ or

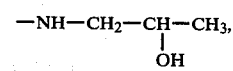

wherein x is 3-8 inclusive, preferably 3-5, inclusive, and at least one of $R^2$ is a hydroxyalkylamine group, enables the replacement of some, if not all of the resins in the production of decorative laminates.

The novel compositions of matter of the present invention comprise a blend of (1)(a) a hydroxyalkylmelamine or (b) a reaction product of a hydroxyalkylmelamine and formaldehyde and (2) a melamine/formaldehyde resin the ratio of (a) to (2) ranging from about 1:1 to about 1:20, respectively, the ratio of (b) to (2) ranging from about 20:1 to about 1:20, respectively, the molar ratio of hydroxyalkylmelamine to formaldehyde in (b) ranging from about 1:0.05 to about 1:3, respectively, and the molar ratio of melamine to formaldehyde in (2) ranging from about 1:1 to about 1:3, respectively, the hydroxyalkylmelamine having the formula above.

The reaction products of the hydroxyalkyl melamine and the formaldehyde i.e. component (b), above, may be produced by reacting the formaldehyde and the hydroxyalkylmelamine in the above-specified molar ratios at a temperature ranging from about 70° C. to about 100° C., preferably from about 80° C. to about 90° C., at a pH ranging from about 8 to about 10 for from about 30 to about 80 minutes. Solvents such as methanol, isopropanol, etc. and catalysts such as triethanolamine; diethylethanolamine, etc. can be used however, they are not normally needed.

When decorative laminates having the improved properties discussed above are produced, the hydroxyalkylmelamine/formaldehyde reaction products need not be used in conjunction with a melamine/formaldehyde resin as a blend. That is to say, the reaction products of the hydroxyalkylmelamine and the formaldehyde may be used as such to impregnate at least one sheet of the decorative laminate to be produced.

As a result, the hydroxyalkylmelamine may be used impregnated into a cellulosic paper sheet, in an amount ranging from about 15% to about 80%, by weight, based on the weight of the sheet, as (A) the hydroxyalkylmelamine-formaldehyde reaction product discussed above,
(B) a blend of the reaction product of the hydroxyalkylmelamine and formaldehyde with a melamine/formaldehyde resin or
(C) a blend of the hydroxyalkylmelamine per se with a melamine/formaldehyde resin.

The hydroxyalkyl melamines are well-known in the art and can be prepared using any known procedure. One procedure which has been found to be particularly advantageous is set forth in U.S. Pat. No. 4,312,988 wherein an alkanolamine is reacted with an appropriately substituted melamine at 100°–250° C. in the presence of an acid catalyst.

The hydroxyalkylmelamines used in the present invention, as prepared by the process of the above-identified U.S. patent, are generally recovered in the form of mixtures in which the individual species vary as to the number of hydroxyalkylamine groups they contain. For convenience, these mixtures are identified by the m.e.q. (hydroxy milliequivalent by gram). The m.e.q. indicates the nature of the mixture and usually ranges from about 4 to about 10.

When the above resin compositions are used to impregnate cellulosic paper sheets and the sheets are then employed in the production of laminates the hydroxyalkylmelamine containing resin can be employed alone or in conjunction with the resins normally used in laminate production. The hydroxyalkylmelamine containing resin can be used to replace all or part of the phenolic resin used in the core sheets of the laminates or all or part of the melamine/formaldehyde resin used in either or both of the decor or print sheet used to impart a decorative effect to the laminate surface or the optional overlay sheet used as a protective layer on the laminate surface.

The core layer of such laminates is usually made up of a plurality of paper sheets i.e. 2–12 such sheets, which are usually impregnated with a phenolic resin. It is the phenolic resin which imparts to the resultant laminate the dark edge line observed at the laminate edge when the laminate is trimmed to size or cut for use. The core sheets are usually constructed of kraft paper which, as mentioned above, can be creped or non-creped or used as combinations of creped and non-creped sheets. The kraft sheets can be unbleached kraft, bleached kraft, pigmented kraft, pigmented, bleached kraft etc. and each of these can be used in the formation of laminates in accordance with the present invention.

When the core sheets are impregnated with the hydroxyalkylmelamine containing resin in the construction of the conventional laminates discussed above, the post-formability of the resultant resin is maintained and the cure cycle sensitivity is reduced i.e. the criticality of undercuring the filler resin is lessened.

Moreover, when the phenolic resin in the core sheet is completely replaced by the hydroxyalkylmelamine resins hereof and the core sheets are pigmented in a color so as to conform to the color of the decorative sheet, the dark edge band or line appearing on the sides of conventional laminates is eliminated. When the laminates are cut or trimmed to size, the cut laminate edge appears of the same color as the laminate surface and, as such, articles of manufacture can be produced of one solid color with no need to champfer or miter the edges thereof to hide the dark edge line. The properties of the resultant laminates meet accepted and required NEMA standards. It is preferred, in the production of these no dark edge laminates that the core sheets be comprised of at least 60% α-cellulose in order that the color match with the decor sheet be as accurate as possible, an effect not always achievable with other types of core paper sheets.

The following examples are set forth for purposes of illustration only and are not to be construed as limitations on the present invention except as set forth in the appended claims. All parts and percentages are by weight unless otherwise specified.

EXAMPLE A

To a suitable reaction vessel are charged 1.2 mols of formaldehyde and 1.0 mol of hydroxyisopropyl melamine, (me.q.≃9.0). The vessel is heated to 90° C. and the pH is adjusted with caustic to 9.3. The reaction is complete in 152 minutes. The resinous reaction product has a gel time of >120 min. at 136° C. The resin solids is 50%.

EXAMPLE B (Comparative)

Attempts to produce a resinous reaction product similar to that of Example A except that the hydroxyisopropylmelamine is replaced by melamine crystal fail because a substantial quantity of melamine cannot be dissolved.

EXAMPLE C

The procedure of Example A is again followed except that molar amount of formaldehyde is increased to 1.6. The reaction is conducted at 90° C. for 107 minutes at a pH of 8.5. The resultant clear, resinous reaction product has a gel time of 50 min. at 136° C. An analog made with melamine crystal in lieu of the hydroxyisopropyl melamine gels in 30 min. at 136 C.

EXAMPLE 1

A blend is prepared from the resinous reaction product of Example A and a standard melamine/formaldehyde resin at a ratio of 1:1. The melamine/formaldehyde (M/F 1.6) resin has a 1:1.6 molar ratio of melamine to formaldehyde. The blend is impregnated into 115 lb. basis weight kraft paper to a 30% resin level and six sheets of the resultant paper are then used to prepare a decorative laminate in conjunction with melamine/formaldehyde resin impregnated decor and overlay sheets. The sheets are laminated at 1400 psi at 145° F. for 1 hour. The resultant laminates are boiled for 4 hours in water without signs of delamination and, after drying, are nearly flat. When the kraft sheets are impregnated with a 1/1.75 phenol/formaldehyde resin alone, the resultant laminates severely warped when boiled.

EXAMPLE 2

The procedure of Example 1 is again followed except that the molar ratio of formaldehyde to hydroxyisopropyl melamine is 2.7/1. Similar results are obtained.

EXAMPLE 3 (Comparative)

When the procedure of Example 1 is again followed except that the hydroxyisopropyl melamine/formaldehyde reaction product is omitted, the laminate completely delaminates in boiling water.

EXAMPLE 4

When the resins are resinous blends of the previous examples are each impregnated into a single sheet of kraft paper at a 30% resin level and tested for the decrease of modulus (Δ GPa) of cured sheets thereof between 25° C. and 156° C., the results set out in Table I, below, are achieved. The greater the decrease in modulus, the better the formability of the sheet.

TABLE I

| Resin | ΔGPa |
|---|---|
| M/F 1.6 | 0.5 |
| Blend of Example 2 | 1.0 |
| Blend of Example 1 | 1.5 |
| Resin of Example A | 2.1 |
| Phenolic Resin of Example 1 | 1.4 |

EXAMPLE 5

A series of four decorative laminates is prepared wherein each laminate is composed of (a) three kraft sheets and one X-crepe kraft sheet in the core, (b) a decor sheet and (c) an overlay sheet. The laminates are pressed at 129° C. for one hour at 1400 psi. and then tested for water absorption and minimum radius bend. The results are set forth in Table II, below. Laminate No. 1 contains the blend of Example 1 above in the overlay at a 65% resin level, a standard melamine/formaldehyde resin in the decor sheet and a standard phenol/formaldehyde resin in the kraft sheets. Laminate No. 2 contains a standard melamine/formaldehyde resin in the overlay and decor sheets and the blend of Example 1 in the kraft sheets. Laminate No. 3 contains a standard melamine/formaldehyde resin in the overlay and decor sheets and only the M/F 1.6 resin of Example 1 in the kraft sheets. Laminate No. 4 contains a standard melamine/formaldehyde resin in the overlay and decor sheets and a standard phenolic resin in the kraft sheets.

TABLE II

| Laminate No. | Minimum Radius Bend (in.) | Water Absorption (%) |
|---|---|---|
| 1 | 0.3 | 6.5 |
| 2 | 0.6 | 8.0 |
| 3 Comparative | 1.0 | 20.0 |
| 4 Comparative | 0.5 | 6.0 |

EXAMPLE 6

Two parts of hydroxyisopropyl melamine (m.e.q. ≈9.0) and 1 part of the F/M 1.6 resin of Example 1, at 50% solids, are blended. The hydroxyisopropylmelamine is prepared as a 50% aqueous solution. A translucent overlay sheet is impregnated with the resultant blend, placed atop melamine/formaldehyde resin impregnated decor sheet and six phenolic resin impregnated kraft sheets and heat and pressure consolidated into a decorative laminate. The laminate withstands two hours in boiling water and meets all NEMA specifications for high pressure decorative laminates.

EXAMPLE 7

When the procedure of Example 6 is again carried out except that only one part of hydroxyisopropylmelamine is employed, similar results are achieved.

EXAMPLE 8

When the procedure of Example 6 is again followed except that 11.2 parts of the F/M 1.6 resin are employed, similar results are achieved.

EXAMPLE 9

A decorative laminate is produced from melamine/formaldehyde resin impregnated overlay and decor sheet and three kraft and one creped kraft paper sheets impregnated with the resin blend of Example 6. The resultant laminate withstands two hours of boiling water, bends to a radius of 0.5 inch or less and meets all NEMA standards for high pressure decorative laminates.

EXAMPLE 10

A laminate is produced as in Example 9 except that the kraft sheets are impregnated with the resin of Example 7. Similar results are achieved.

EXAMPLE 11

A laminate is again produced as in Example 9 except that the kraft sheets are impregnated with the resin of Example 8. Again, excellent results are achieved.

EXAMPLE 12

A decorative laminate is produced from a melamine/formaldehyde resin impregnated overlay sheet, a melamine/formaldehyde resin impregnated, white pigmented decor sheet and sufficient white pigmented 100 lb./b.w. α-cellulose paper sheets impregnated with the resin of Example 6 to produce a laminate 0.04 in. thick. The resultant laminate also withstands two hours of boiling water and meets all NEMA specifications for high pressure decorative laminates. The edge of the laminate, when trimmed or cut, is white and reveals no dark band. Exposure to a standard fadeometer test does not darken the edge.

EXAMPLE 13

The procedure of Example 12 is again followed except that the resin of Example 7 is used to impregnate the α-cellulose paper sheets. Again, a decorative laminate is produced with white edges and excellent physical properties.

EXAMPLE 14

Again following the procedure of Example 12 except that the α-cellulose core sheets are impregnated with the resin of Example 8, a solid white laminate which passes NEMA specifications is produced.

EXAMPLE 15 (Comparative)

A decorative laminate is prepared using an α-cellulose overlay sheet, a blue pigmented print sheet and a plurality of kraft paper core sheets. The M/F 1.6 resin alone of Example 1 is impregnated into each component and the cure of the resin is adjusted to create in it a 59 minute gel time. The resultant laminate forms to a 0.9 inch minimum radius. The surface gloss is 90 and the blister time is 76 seconds.

EXAMPLE 16

The procedure of Example 15 is followed except that the resin impregnated into the overlay, print sheet and kraft core sheets contains 10% hydroxyisopropylmelamine (m.e.q. ≈9.0). The gel time is adjusted to the same 59 minutes. The resultant laminate forms to a 0.4 inch minimum radius and the gloss and blister time are maintained at 90 and 76, respectively.

EXAMPLE 17

Replacement of only the resin used to impregnate the kraft sheets of the laminate of Example 15 with a blend of M/F 1.6 and 10% hydroxyisopropylmelamine (m.e.q. ≈9.0) results in a laminate having a minimum radius formability of 0.9 inch, however, when 30% of the hydroxyisopropylmelamine is employed in only the kraft sheets as a blend with the M/F 1.6 resin, the minimum radius formability of the resultant laminate is reduced to 0.5 inch. Gel time is again adjusted to 59 minutes.

EXAMPLE 18

The procedure of Example 15 is again followed except that the laminate is produced from core sheets of blue pigmented α-cellulose paper. The overlay and print sheets are impregnated with a blend of 90 parts of the M/F 1.6 resin and 10 parts of hydroxyisopropylmelamine (m.e.q. ≈9.0) and the α-cellulose core sheets are impregnated with a blend of 70 parts of the M/F 1.6 resin and 30 parts of the hydroxyisopropylmelamine. The same 59 minutes gel time is created. The resultant laminate exhibits a 0.15 inch formability, a surface gloss of 93 and a blister time of 82 seconds. The laminate edge is solid blue matching the print sheet.

EXAMPLE 19 (comparative)

When the procedure of Example 18 is again followed except that a phenolic resin is employed to impregnate the α-cellulose core sheets, the laminate edge is severely discolored.

EXAMPLE 20 (Comparative)

When the procedure of Example 18 is followed except that the α-cellulose core sheets are impregnated with only the M/F 1.6 resin, the resultant laminate cannot be post-formed.

EXAMPLE 21

If the procedure of Example 18 is followed except that the same resin blend used to impregnate the overlay and print sheets is used to impregnate the α-cellulose core sheets, the formability is 0.4 inch but the gloss and blister resistance are maintained.

EXAMPLE 22

A resin blend of 90 parts of F/M 1.6 and 10 parts of hydroxyisopropylmelamine (m.e.q. ≈9.0) is used to impregnate a translucent overlay sheet. The treated overlay is then layered over a raw, unimpregnated print sheet and six sheets of phenolic resin impregnated kraft sheets. A laminate is produced by pressing at 1400 psi at 145° C. for 1 hour. A control laminate is then prepared by eliminating the hydroxyisopropylmelamine from the overlay resin, all else remaining equal. Both laminates are then tested for stress-cracking by first equilibrating at high humidity, clamping in a rigid test jig and then drying to low humidity to cause shrinkage and stress build-up. The control laminate cracks after 26 hours while the hydroxyisopropylmelamine modified laminate does not crack after 39 hours.

EXAMPLE 23

A series of decorative laminates are produced using 26 lb./b.w. transluscent overlay paper, 75 lb./b.w. print paper and a core composed of 3 sheets of regular kraft paper and 1 sheet of X-creped kraft. The overlay and print sheets are impregnated with Resins A, B, C and D, below, while the core sheets are impregnated with a standard phenolic resin. The laminates are pressed at 1400 psi, 129° C. for 1 hour. A control laminate is also prepared using the above impregnated core sheets with a M/F 1.6 resin used to impregnate the overlay and print sheets.

Resin A
    A melamine/formaldehyde (1/2.7) resin containing 6.5%, based on resin solids, of o,p-toluenesulfonamide and 0.003 (mole ratio) of diethylethanolamine.

Resin B
    Resin A containing 10%, based on resin solids weight, of hydroxyisopropylmelamine, (m.e.q. ≈9.0)

Resin C
    A melamine/formaldehyde resin (1/1.3) containing 0.04 mole ratio of triethanolamine and 5%, based on the resin solids, of hydroxyisopropylmelamine, (m.e.q. ≈9.0)

Resin D
    Resin C containing 10%, based on resin solids, of hydroxyisopropylmelamine, (m.e.q. ≈9.0).

Postforming laminates are prepared from Resins A and B adjusted to various pH levels and are evaluated for minimum radius bend. The results are set forth in Table III, below.

TABLE III

| | Minimum Radius |
|---|---|
| Resin A | — 1.00 inch at pH 9.0 |
| Resin A | — 1.00 inch at pH 9.5 |
| Resin A | — 1.00 inch at pH 10.0 |
| Resin B | — 0.61 inch at pH 9.0 |
| Resin B | — 0.53 inch at pH 9.5 |
| Resin B | — 0.55 inch at pH 10.0 |
| Control Laminate | — 0.74 inch at pH 9.3 |

Postforming laminates are prepared at 129° max. and 149° max. temperatures from Resins C and D and evaluated for minimum radius bend. The results are set forth in Table IV, below.

TABLE IV

| | Min. Radius (129° Max. Temp.) | Min. Radius (149° Max. Temp.) |
|---|---|---|
| Resin C | 0.32 inch | 0.72 inch |
| Resin D | 0.38 inch | 0.48 inch |
| Control Laminate (above) | 0.65 inch | 1.00 inch |

The resin containing 10% hydroxyisopropylmelamine forms well in spite of overcure at 149° C.

EXAMPLES 24–30

The procedure of Example 1 is again followed except that the hydroxyisopropylmelamine is replaced, in each instance, by a different melamine derivative in accordance with Formula I, above. The derivatives used are set forth in Table V, below.

TABLE V

| Example | R₁ (Melamine Derivative) | R₂ | X | Laminate Properties |
|---|---|---|---|---|
| 24 | CH₃ | —NHCH₂CH(OH)—CH₃ | 0 | Same as Example 1 |
| 25 | C₈H₁₇ | " | " | Same as Example 1 |
| 26 | C₆H₅ | " | " | Same as Example 1 |
| 27 | —NHCH₂CH(OH)—CH₃ | " | " | Same as Example 6* |
| 28 | NH₂ | " | " | Same as Example 1 |
| 29 | " | —NH(CH₂)ₓOH | 8 | Same as Example 9 |
| 30 | " | " | 4 | Same as Example 9 |

*procedure of Example 6 used instead of Example 1.

We claim:

1. A composition of matter comprising a blend of (1) (a) a hydroxyalkyl melamine or (b) a reaction product of a hydroxyalkyl melamine and formaldehyde and (2) a melamine/formaldehyde resin, the ratio of (a) to (2) ranging from about 1:1 to about 1:20, respectively, the ratio of (b) to (2) ranging from about 20:1 to about 1:20, respectively, the molar ratio of hydroxyalkylmelamine to formaldehyde in (b) ranging from about 1:0.05 to about 1:3, respectively, and the molar ratio of melamine to formaldehyde in (2) ranging from about 1:1 to about 1:3, respectively, said hydroxyalkyl melamine having the formula

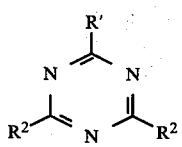

wherein R' is a C₁–C₈ linear or branched chain alkyl group, a C₆–C₁₀ aryl group or R² and R² is —NH₂, —NH(CH₂)ₓOH or

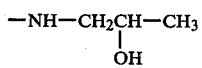

—NH—CH₂CH(OH)—CH₃ wherein x is 3–8, inclusive, and at least one of R² is a hydroxyalkylamine group.

2. A composition according to claim 1 wherein said hydroxyalkyl melamine is a hydroxypropyl melamine.

3. A cellulosic paper sheet having impregnated therein from about 15% to about 80%, by weight, based on the weight of the paper, of (A) a m hydroxyalkylmelamine/formaldehyde reaction product having a molar ratio of hydroxyalkylmelamine to formaldehyde of from about 1:0.05 to about 1:3, respectively, or (B) a blend of A, above, and a melamine/formaldehyde resin, the ratio of A to melamine/formaldehyde resin ranging from about 20:1 to about 1:20, respectively, and the ratio of melamine to formaldehyde ranging from about 1:1 to 1:3, respectively, or (C) a blend of a hydroxy alkyl melamine and a melamine/formaldehyde resin, the ratio of hydroxy alkyl melamine to melamine/formaldehyde resin ranging from about 1:1 to about 1:20, respectively, and the ratio of melamine to formaldehyde ranging from about 1:1 to about 1:3, respectively, said hydroxyalkyl melamine having the formula

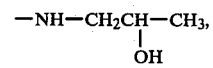

—NH—CH₂CH(OH)—CH₃, wherein R' is a C₁–C₈ linear or branched chain alkyl, a C₆–C₁₀ aryl, or R² and R² is —NH₂—NH(CH₂)ₓOH or

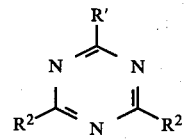

wherein x is 3–8, inclusive, and at least one R² is a hydroxyalkylamine group.

* * * * *